United States Patent
Behrens et al.

(10) Patent No.: US 7,055,781 B2
(45) Date of Patent: Jun. 6, 2006

(54) COOLED INSULATION SURFACE TEMPERATURE CONTROL SYSTEM

(75) Inventors: William W. Behrens, St. Louis, MO (US); Andrew R. Tucker, Glendale, MO (US); James E. French, Ballwin, MO (US); Gayl J. Miller, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/455,204

(22) Filed: Jun. 5, 2003

(65) Prior Publication Data

US 2004/0245389 A1 Dec. 9, 2004

(51) Int. Cl.
*B64G 1/58* (2006.01)

(52) U.S. Cl. .................................................. 244/158 A

(58) Field of Classification Search ............ 244/158 A, 244/207, 208, 209, 163, 117 A, 121, 177 R
See application file for complete search history.

(56) References Cited

U.S. PATENT DOCUMENTS

| | | | |
|---|---|---|---|
| 2,908,455 A * | 10/1959 | Hoadley | ................. 244/117 A |
| 2,941,759 A * | 6/1960 | Schwartz et al. | ........ 244/117 A |
| 3,261,576 A * | 7/1966 | Valyi | ......................... 244/130 |
| 3,307,616 A | 3/1967 | Giger | |
| 3,452,553 A * | 7/1969 | Leonard et al. | ............... 62/239 |
| 4,849,276 A | 7/1989 | Bendig et al. | |
| 4,990,391 A * | 2/1991 | Veta et al. | .................. 428/116 |
| 4,991,797 A * | 2/1991 | Miller et al. | ............ 244/117 R |
| 5,000,998 A | 3/1991 | Bendig et al. | |
| 5,041,321 A | 8/1991 | Bendig | |
| 5,236,151 A * | 8/1993 | Hagle et al. | ............. 244/117 A |
| 5,310,592 A | 5/1994 | Baker et al. | |
| 5,322,725 A | 6/1994 | Ackerman et al. | |
| 5,330,124 A * | 7/1994 | Le Touche | .............. 244/117 A |
| 5,402,965 A * | 4/1995 | Cervisi et al. | ................. 244/2 |
| 5,618,363 A * | 4/1997 | Mullender et al. | ......... 156/62.2 |
| 5,624,613 A | 4/1997 | Rorabaugh et al. | |
| 5,632,151 A | 5/1997 | Baker et al. | |
| 5,958,583 A | 9/1999 | Rorabaugh et al. | |
| 5,980,980 A | 11/1999 | DiChiara, Jr. et al. | |
| 6,007,026 A | 12/1999 | Shorey | |
| 6,074,699 A | 6/2000 | Dichiara, Jr. et al. | |
| 6,086,664 A | 7/2000 | Blohowiak et al. | |
| 6,210,773 B1 | 4/2001 | Moore | |

(Continued)

FOREIGN PATENT DOCUMENTS

EP 823 611 A1 2/1998

OTHER PUBLICATIONS

International Search Report in PCT/US04/017309 dated Oct. 11, 2004.
Written Opinion in PCT/US04/017309 dated Oct. 11, 2004.
Patent Application Specification for U.S. Appl. No. 10/457,594, filed Jun. 9, 2003.

*Primary Examiner*—Tien Dinh
(74) *Attorney, Agent, or Firm*—Marshall, Gerstein & Borun LLP

(57) ABSTRACT

An apparatus and method for surface temperature control is provided. Surface temperature control is achieved by flowing coolant in and then out of a low strength porous layer attached to a structural plenum. A semi-permeable layer may be attached to the outer surface of the porous layer to prevent erosion of the porous layer and to facilitate surface film cooling.

27 Claims, 3 Drawing Sheets

U.S. PATENT DOCUMENTS

| | | |
|---|---|---|
| 6,273,365 B1 | 8/2001 | Hiesener et al. ......... 244/118.1 |
| 6,419,189 B1 | 7/2002 | DiChiara, Jr. et al. |
| 2002/0149128 A1 | 10/2002 | DiChiara, Jr. |
| 2002/0195525 A1 | 12/2002 | Anton et al. |
| 2003/0032545 A1 | 2/2003 | DiChiara, Jr. |
| 2003/0082414 A1 | 5/2003 | DiChiara, Jr. et al. |

\* cited by examiner

| AREA | SURFACE TEMPERATURE °F | |
|---|---|---|
| I |  | 700 TO 1000 |
| II |  | 1000 TO 1600 |
| III |  | 1600 TO 2000 |
| IV |  | > 2000 |
|  |  | NOT PART OF STUDY |

COOLED INSULATION SURFACE TEMPERATURE CONTROL SYSTEM

BACKGROUND OF THE INVENTION

1. Field of the Invention

This invention is generally directed to methods and apparatuses providing surface temperature control in a high heat flux environment with concurrent high velocity flow over the surface, and, more particularly, to surface temperature control methods and apparatuses traditionally involving film cooling or transpiration cooling in the aforementioned environment.

2. Description of the Related Art

Many engineering applications, including various components of aircraft, missiles and spacecraft, require temperature control on surfaces bounding high velocity flow while simultaneously being subjected to high incident heat flux. Conventional methods of surface temperature control under such conditions are film cooling and transpiration cooling.

A typical film cooling system includes a load bearing structural plenum having a large number of small holes drilled in the outer structural wall thereof. The cooling air exits the plenum through these holes thereby forming a cooling film that reduces the temperature of the outer structural wall. However, such a cooling system has disadvantages; a large number of holes must be drilled in the surface to be cooled, increasing the cost and complexity of the plenum while reducing its structural strength. Furthermore, the holes must be carefully designed to give an effective cooling film over a wide variety of external environments. Cooling air exiting at too high of a velocity will blow through and out of the surface boundary layer into the free stream flow, resulting in reduced heat transfer at the plenum outer wall and correspondingly poor surface temperature control.

A typical transpiration cooling system includes a plenum bounded by an outer wall consisting of a structural porous material formed from a sintered metal or a ceramic. These porous materials have a large surface area per unit volume, and are capable of providing highly effective cooling of the material and correspondingly good surface temperature control. However, selecting the type of porous material to use as the outer wall of the plenum is a difficult design problem. Structural ceramics tend to be brittle and have less structural strength than metals. Sintered metals tend to be stronger but are also heavier than structural ceramics, and thus may impose an unacceptable weight penalty.

SUMMARY OF THE INVENTION

In accordance with one aspect of the invention, a surface temperature control apparatus is provided that includes a structural cooling air plenum bounded by an inner and an outer wall. A porous layer is attached to the outer wall. The porous layer may include a low strength ceramic foam. Surface temperature control may be achieved by flowing cooling air into and then out of the porous layer. A small number of entrance holes for the coolant are provided that may be drilled through the outer plenum wall into the porous layer.

A semi-permeable layer may be attached to the outer surface of the porous layer to prevent erosion of the porous layer and to ensure that a majority of the coolant flow exits the porous layer through small holes that may be drilled or punched through the semi-permeable layer. Coolant flow exiting through the surface exit holes combines with coolant transpiring through the semi-permeable layer forming a cooling film at the surface.

BRIEF DESCRIPTION OF THE DRAWINGS

Objects, features, and advantages of the present invention will be become apparent upon reading the following description in conjunction with the drawings figures, in which.

DETAILED DESCRIPTION

Figure 1:
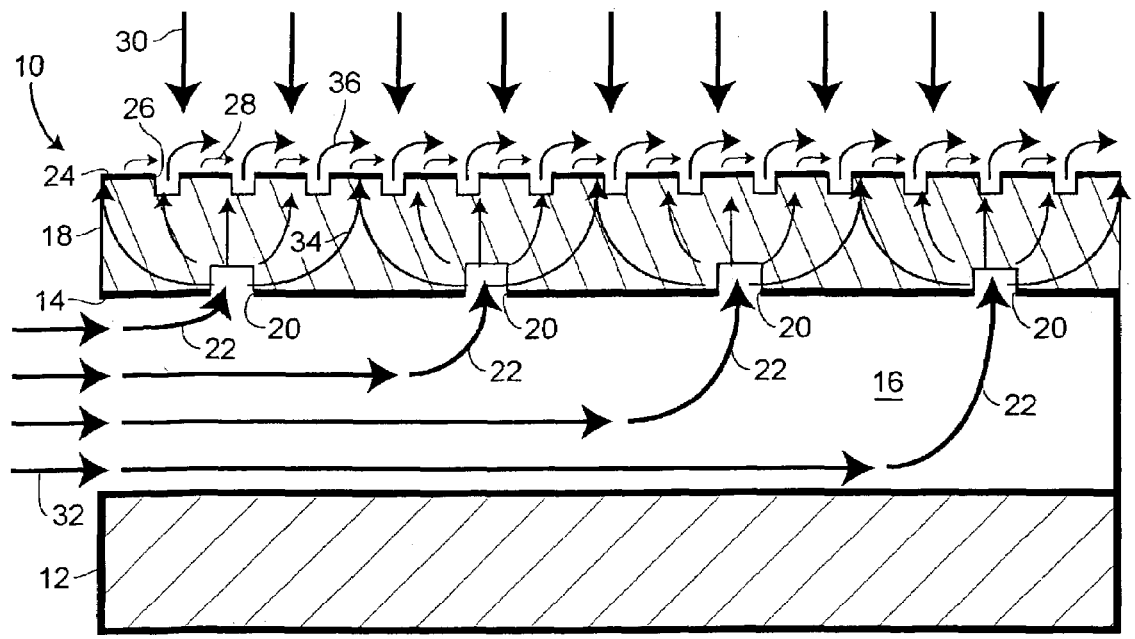
FIG. 1 is a cross-sectional view of a cooling apparatus according to the invention.

With reference initially to FIG. 1, a cooling apparatus, generally indicated at 10, includes an inner structural member 12 that is combined with an outer structural wall 14, forming a structural cooling air plenum 16 therebetween. The inner structural member 12 and the outer structural wall 14 may be formed from a metallic material, such as, titanium. A porous layer 18 may be adhesively bonded or otherwise attached to the outer structural wall 14, and entrance holes 20 may be formed in the outer structural wall 14 and may penetrate the porous layer 18 providing flow of cooling air as indicated by the bold face arrows 22 from the plenum 16 into the porous layer 18 (for example, by providing pressurized air within the plenum 16). The entrance holes 20 may, for example, have a diameter of about 2.29 mm (90 mils), a depth of up to one half the thickness of the porous layer 18, and may be spaced apart by about 6.9 mm (0.27").

The porous layer 18 may have a void size of less than 50 microns, and may be formed from a ceramic foam insulation. The low thermal conductivity of ceramic foam helps minimize the cooling required of the surface temperature control system. The low structural strength of ceramic foam compared to conventional porous materials is unimportant since the underlying structural plenum functions as the primary load bearing structure. An example of the type of ceramic foam referred to is the commercially available Rescor 360 rigid thermal insulation. This insulation is manufactured by the Cotronics Corporation and may have a density of about 256.3 kg/m$^3$ (16 lbs./ft.$^3$) and a thickness of about 2.54 cm (1.0"). Because of the insulative qualities of the ceramic foam, it may be bonded to the plenum using commercially available room temperature vulcanizing (RTV) silicone such as GE RTV-630, GE RTV-560, or Dow Corning DC3145. Bondline thickness for the adhesive may be as thin as 0.2 mm (0.008").

A semi-permeable layer 24 may be disposed on an exterior surface of the porous layer 18. The semi-permeable layer 24 protects the underlying low strength porous layer from erosion by high velocity flow and may be composed of a densification layer covered with a ceramic matrix composite (CMC). An example of a densification product is the commercially available Rescor 901 Å liquid insulation hardener and rigidizer made by the Cotronics Corporation. Nextel 312 fabric combined with a sintered ceramic matrix is an example of a CMC. In an environment where radiation is the dominant mode of heat transfer, the semi-permeable layer 24 could instead be a highly reflective semi-permeable skin that, when bonded to the exterior surface of the porous layer 18, would both restrict transpiration and minimize absorbed energy.

Figure 2:
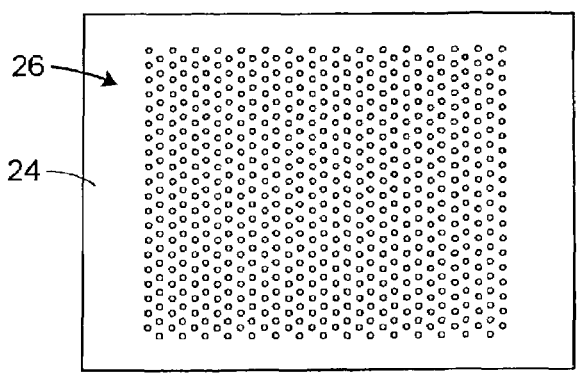
FIG. 2 is a plan view of the cooling apparatus of FIG. 1.

The semi-permeable barrier layer may include a plurality of perforations which function as exit holes 26 for the cooling air. These exit holes 26 do not need to be aligned with the entrance holes 20 and may be laid out in staggered rows, forming a uniform grid as depicted in FIG. 2. The ratio of exit holes 26 to entrance holes 20 may be about 10.7 exit holes per entrance hole. The exit holes 26 may have a diameter of about 1 mm (40 mils), a depth of about 2.5 mm (0.1") and may be spaced 3.05 mm (0.12") apart. The exit holes 26 may be formed using a drilling operation or a simple and inexpensive punching operation that penetrates a portion of the semi-permeable layer 24, without the need for an expensive drilling operation.

A heat source, indicated by arrows 30, is disposed above the cooling apparatus 10. Cooling air introduced into the plenum 16, as indicated by arrows 32, enters the porous layer 18 through the entrance holes 20, as indicated by arrows 22. The cooling air then spreads in the plane of the porous layer 18 while traveling through the thickness of the porous layer 18, as signified by a plurality of arrows 34 shown in the porous layer 18. The majority of the cooling air flows through the exit holes 26, as indicated by arrows 36, since the semi-permeable layer 24 is a significant hindrance to the flow of cooling air out of the porous layer 18. The small amount of cooling air that does not flow through the exit holes 26 transpires through the semi-permeable layer 24 in the areas between the exit holes 26, as indicated by arrows 28.

The invention combines the best attributes of film and transpiration cooling while overcoming limitations in each method. This system has far fewer holes drilled through the outer wall of the plenum compared to what would be needed in a conventional film cooling system. This makes for a more easily manufactured and structurally stronger plenum. A small number of entrance holes in the outer plenum wall maintains even surface temperature control because the cooling air readily diffuses both in-plane and through the thickness of the porous layer, an effect that is amplified by the severe restriction of transpiration that occurs at the semi-permeable layer.

As compared to a conventional film cooling system, the coolant exit holes can be thought of as having been moved out from the outer plenum wall to the surface of the porous ceramic foam. The exit holes can be easily manufactured in the porous foam by using a simple punch that penetrates the semi-permeable barrier without having to employ an expensive drilling operation.

The ceramic foam layer additionally serves to greatly reduce the exit velocity of the cooling air. Lower cooling velocities reduce boundary layer penetration, thereby avoiding a common pitfall of conventional film cooling systems and instead providing cooling performance comparable to conventional transpiration cooling systems. The low conductivity of the porous ceramic foam insulation minimizes heat transfer from the high heat flux environment and so allows the plenum to be constructed from lower temperature, lower cost materials. The low strength of the lightweight ceramic foam insulation is mitigated by bonding the foam directly to the outer structural plenum wall. This arrangement is stronger than systems utilizing conventional transpiration cooled ceramics, and is lighter than porous sintered metal transpiration cooling systems.

These benefits are realized in a system providing surface temperature control superior to conventional film cooling systems and comparable to conventional transpiration cooling systems. The thermal efficiency of the invention is high because the combination of film cooling and transpiration cooling embodied in this system creates a cooling film at the outer surface with minimal boundary layer penetration. This in turn means that lower coolant flow rates are needed to achieve a given surface temperature when compared to conventional film cooling systems.

The thermal efficiency of the invention has been demonstrated in laboratory experiments. A test was conducted in which a 2.54 cm (1") thick porous ceramic insulation sheet with a hardened CMC semi-permeable layer attached was adhesively bonded to a titanium substrate using high temperature silicone. The semi-permeable layer of the sample was penetrated by exit holes arranged in a uniform grid consisting of staggered rows of holes. These holes were about 1 mm (40 mils) in diameter, spaced about 3.05 mm (0.12") apart and penetrated to a depth of about 2.54 mm (0.1"). Entrance holes having a diameter of about 2.29 mm (90 mils) were drilled through the titanium substrate at a hole density of 10.7 exit holes per entrance hole. High velocity, high temperature air was directed tangentially over the surface of the sample while cooling air was blown through the sample at several flowrates.

Figure 3:
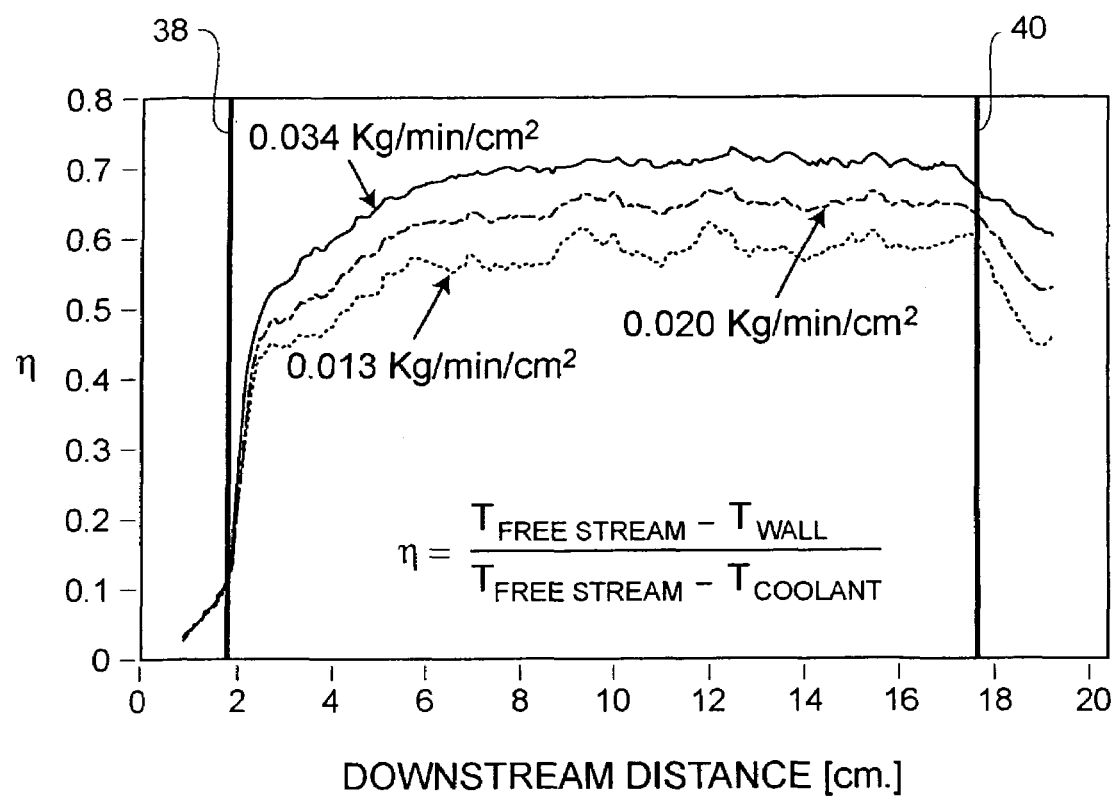
FIG. 3 is a graph of cooling effectiveness as a function of downstream distance that provides an example of the cooling effectiveness which can be achieved using this invention.
Figure 4:
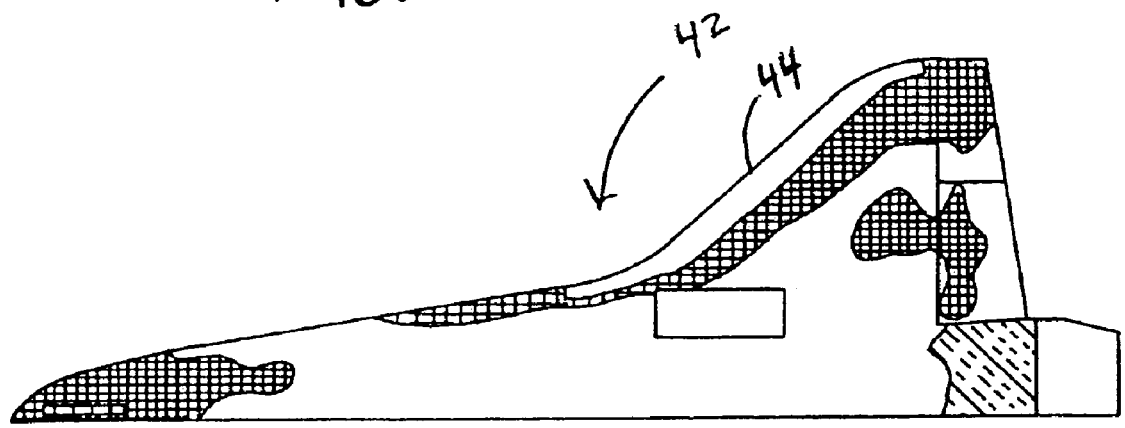
FIG. 4 is a lower surface view illustrating the surface temperature of the Space Shuttle following reentry, showing hot spots on the upper surface where cooled insulation surface temperature control systems and methods in accordance with the invention may be used.

Results from this test are presented in FIG. 3. The figure plots cooling effectiveness $\eta$, as a function of downstream distance over the sample. Cooling effectiveness is a measure of the efficiency with which the cooling air lowers the sample surface temperature below the uncooled surface temperature, as indicated in the equation shown annotated on the plot. A cooling effectiveness of 0.0 corresponds to a cooled wall temperature equal to the uncooled wall temperature while a cooling effectiveness of 1.0 corresponds to a cooled wall temperature equal to the plenum supply temperature of the coolant. Vertical lines on the plot, 38 and 40, delineate the upstream and downstream limits, respectively, of the exit hole grid on the sample surface.

The effect of two distinct cooling modes at the sample surface can be seen in the shape of the effectiveness curves. There is an initial upstream region over which the cooling film thickness builds characterized by rapidly rising effectiveness, followed by a fully developed cooling film region characterized by approximately constant effectiveness.

The invention achieves a high level of about 71% cooling effectiveness in the fully developed region with a modest 0.034 kg/min/cm$^2$ (0.49 lbm/min/in$^2$) cooling air flowrate. Cutting the coolant flowrate over 40% to 0.020 kg/min/cm$^2$ (0.29 lbm/min/in$^2$) only reduces the fully developed effectiveness to about 65%. A further reduction in flowrate to 0.013 kg/min/cm$^2$ (0.18 lbm/min/in$^2$) produces a fully developed effectiveness of about 59%. The fact that only 12 percentage points in effectiveness are lost for a nearly two thirds reduction in coolant flowrate highlights the high thermal efficiency of the invention.

The effectiveness curves also show the high degree of cooling uniformity achieved over the fully developed region of the sample surface, especially at the higher flowrates. This shows that the invention produces a correspondingly high degree of uniformity in surface temperature.

A cooling system according to the invention is cheaper, structurally stronger, and more thermally efficient than conventional film cooling systems. The invention also provides a cooling system that is structurally stronger, lighter in weight, and is at least as thermally efficient as conventional transpiration cooling systems. Furthermore, the invention can easily be adapted to a variety of design situations occurring on aircraft, missiles, hypersonic vehicles, and spacecraft.

Although the preferred embodiments of the invention have been disclosed for illustrative purposes, those skilled in the art will appreciate that various modifications, additions, and substitutes are possible, without departing from the scope and spirit of the invention as disclosed herein and in the accompanying claims. For example, although air has been disclosed as a coolant, other fluids may of course be used.

What is claimed is:

1. An apparatus comprising:
   an inner structural member and an outer structural wall defining a plenum there between, said plenum adapted to contain a pressurized cooling fluid;
   a porous layer attached to said outer structural wall and including a ceramic foam insulation layer; and
   a hardened perforated layer disposed on an exterior surface of the porous layer;
   said outer structural wall including openings therein, said openings adapted to provide a flow of cooling fluid from said plenum to said porous layer.

2. The apparatus of claim 1 wherein said hardened perforated layer is made from a semi-permeable material.

3. The apparatus of claim 2, wherein said semi-permeable material is a hardened ceramic matrix composite.

4. The apparatus of claim 1, wherein said outer structural wall is formed from a metallic material.

5. An aircraft comprising:
   a structural member including an inner structural member and an outer structural wall defining a plenum there between, said plenum adapted to contain a pressurized cooling fluid;
   a porous layer bonded to said outer structural wall and including a ceramic foam insulation layer; and
   a hardened perforated layer disposed on an exterior surface of the porous layer;
   said outer structural wall including openings therein, said openings adapted to provide a flow of cooling fluid from said plenum to said porous layer.

6. The apparatus of claim 5, wherein said hardened perforated layer is made from a semi-permeable material.

7. The apparatus of claim 6, wherein said semi-permeable material is a hardened ceramic matrix composite.

8. The aircraft of claim 5, wherein said outer structural wall is formed from a metallic material.

9. A space vehicle comprising:
   a structural member including an inner structural member and an outer structural wall defining a plenum there between, said plenum adapted to contain a pressurized cooling fluid;
   a porous layer bonded to said outer structural wall and including a ceramic foam insulation layer; and
   a hardened perforated layer disposed on an exterior surface of the porous layer;
   said outer structural wall including openings therein, said openings adapted to provide a flow of cooling fluid from said plenum to said porous layer.

10. The space vehicle of claim 9, wherein said hardened perforated layer is made from a semi-permeable material.

11. The space vehicle of claim 10, wherein said semi-permeable material is a hardened ceramic matrix composite.

12. The space vehicle of claim 9, wherein said outer structural wall is formed from a metallic material.

13. An apparatus comprising:
    an inner structural member and an outer structural wall defining a plenum there between for a coolant fluid;
    a porous layer attached to the outer structural wall and including a ceramic foam insulation layer;
    the outer structural wall including openings therein;
    the porous layer having a number of openings, which at least partially penetrate the porous layer for providing flow of the coolant fluid;
    wherein the porous layer has a number of exit openings, which at least partially penetrate an exterior surface of the porous layer; and
    wherein the exit openings of the porous layer are laid out in staggered rows and form a uniform grid.

14. An apparatus comprising:
    an inner structural member and an outer structural wall defining a plenum there between for a coolant fluid;
    a porous layer attached to the outer structural wall and including a ceramic foam insulation layer;
    the outer structural wall including openings therein;
    the porous layer having a number of openings, which at least partially penetrate the porous layer for providing flow of the coolant fluid;
    wherein the porous layer has a number of entrance openings, which at least partially penetrate an interior surface of the porous layer, and a number of exit openings, which at least partially penetrate an exterior surface of the porous layer; and
    wherein the ratio of exit openings to entrance openings is about 10 exit openings per entrance opening.

15. An apparatus comprising:
    an inner structural member and an outer structural wall defining a plenum there between for a coolant fluid;
    a porous layer attached to the outer structural wall and including a ceramic foam insulation layer;
    the outer structural wall including openings therein;
    the porous layer having a number of openings, which at least partially penetrate the porous layer for providing flow of the coolant fluid;
    further including a perforated layer disposed on an exterior surface of the porous layer.

16. The apparatus of claim 15, wherein the perforated layer is made from a semi-permeable material.

17. The apparatus of claim 16, wherein the semi-permeable material is a hardened ceramic matrix composite.

18. An aircraft comprising:
    a structural member including an inner structural member and an outer structural wall defining a plenum there between for a coolant fluid;
    a porous layer bonded to the outer structural wall and including a ceramic foam insulation layer;
    the outer structural wall including openings therein;
    the porous layer having a number of openings, which at least partially penetrate the porous layer for providing flow of the coolant fluid;
    wherein the porous layer has a number of exit openings, which at least partially penetrate an exterior surface of the porous layer; and
    wherein the exit openings of the porous layer are laid out in staggered rows and form a uniform grid.

19. An aircraft comprising:
    a structural member including an inner structural member and an outer structural wall defining a plenum there between for a coolant fluid;

a porous layer bonded to the outer structural wall and including a ceramic foam insulation layer;

the outer structural wall including openings therein;

the porous layer having a number of openings, which at least partially penetrate the porous layer for providing flow of the coolant fluid;

wherein the porous layer has a number of entrance openings, which at least partially penetrate an interior surface of the porous layer, and a number of exit openings, which at least partially penetrate an exterior surface of the porous layer; and wherein the ratio of exit openings to entrance openings is about 10 exit openings per entrance opening.

20. An aircraft comprising:

a structural member including an inner structural member and an outer structural wall defining a plenum there between for a coolant fluid;

a porous layer bonded to the outer structural wall and including a ceramic foam insulation layer;

the outer structural wall including openings therein;

the porous layer having a number of openings, which at least partially penetrate the porous layer for providing flow of the coolant fluid; and further including a perforated layer disposed on an exterior surface of the porous layer.

21. The aircraft of claim 20, wherein the perforated layer is made from a semi-permeable material.

22. The aircraft of claim 21, wherein the semi-permeable material is a hardened ceramic matrix composite.

23. A space vehicle comprising:

a structural member including an inner structural member and an outer structural wall defining a plenum there between for a coolant fluid;

a porous layer bonded to the outer structural wall and including a ceramic foam insulation layer;

the outer structural wall including openings therein;

the porous layer having a number of openings, which at least partially penetrate the porous layer for providing flow of the coolant fluid;

wherein the porous layer has a number of exit openings, which at least partially penetrate an exterior surface of the porous layer; and wherein the exit openings of the porous layer are laid out in staggered rows and form a uniform grid.

24. A space vehicle comprising:

a structural member including an inner structural member and an outer structural wall defining a plenum there between for a coolant fluid;

a porous layer bonded to the outer structural wall and including a ceramic foam insulation layer;

the outer structural wall including openings therein;

the porous layer having a number of openings, which at least partially penetrate the porous layer for providing flow of the coolant fluid;

wherein the porous layer has a number of entrance openings, which at least partially penetrate an interior surface of the porous layer, and a number of exit openings, which at least partially penetrate an exterior surface of the porous layer; and wherein the ratio of exit openings to entrance openings is about 10 exit openings per entrance opening.

25. A space vehicle comprising:

a structural member including an inner structural member and an outer structural wall defining a plenum there between for a coolant fluid;

a porous layer bonded to the outer structural wall and including a ceramic foam insulation layer;

the outer structural wall including openings therein;

the porous layer having a number of openings, which at least partially penetrate the porous layer for providing flow of the coolant fluid;

further including a perforated layer disposed on an exterior surface of the porous layer.

26. The space vehicle of claim 25, wherein the perforated layer is made from a semi-permeable material.

27. The space vehicle of claim 26, wherein the semi-permeable material is a hardened ceramic matrix composite.

* * * * *